No. 839,158. PATENTED DEC. 25, 1906.
E. KOPE.
PAN ATTACHMENT.
APPLICATION FILED JAN. 16, 1906.
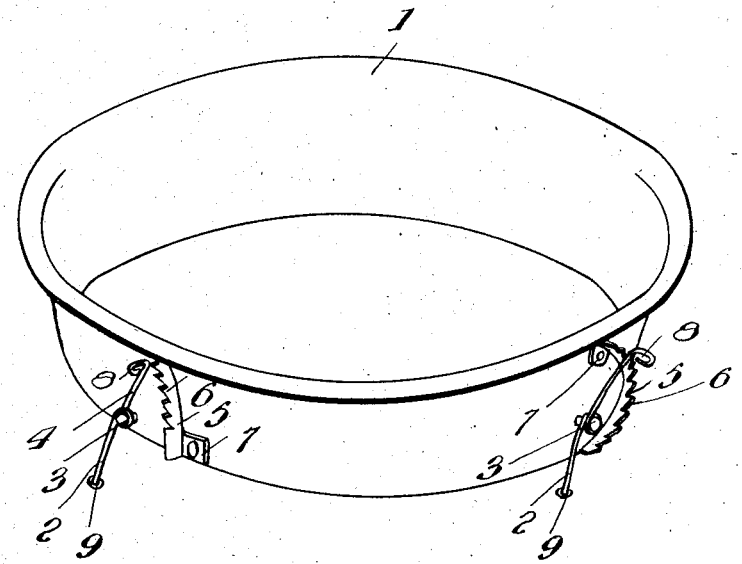
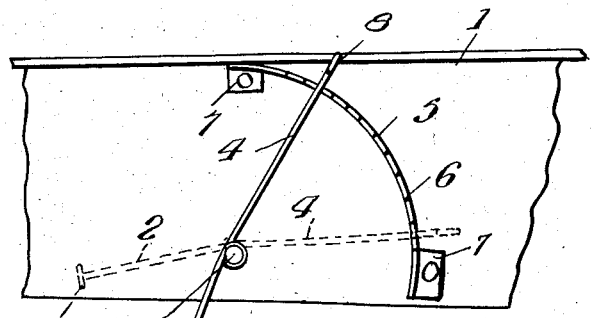
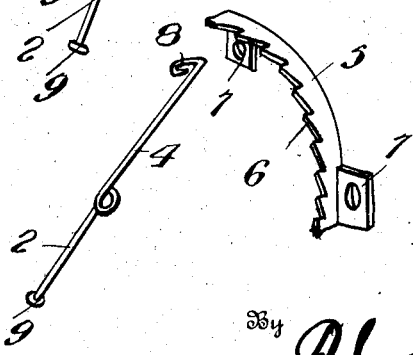
Inventor
Earnest Kope
Witnesses
By
, Attorneys

UNITED STATES PATENT OFFICE.

EARNEST KOPE, OF FERNDALE, WASHINGTON.

PAN ATTACHMENT.

No. 839,158.   Specification of Letters Patent.   Patented Dec. 25, 1906.

Application filed January 16, 1906. Serial No. 296,363.

*To all whom it may concern:*

Be it known that I, EARNEST KOPE, a citizen of the United States, residing at Ferndale, in the county of Whatcom and State of Washington, have invented certain new and useful Improvements in Pan Attachments, of which the following is a specification.

This invention has for its primary object to provide an improved attachment for pans or similar cooking utensils whereby they can be held in a spaced position with relation to the stove or other source of heat, and thus prevented from burning.

A further object is to so construct the attachment that the elevation of the pan can be adjusted and the temperature thereof thereby regulated as desired.

With these objects in view the invention consists, essentially, of a plurality of pivotally-mounted supports for the pan and racks adapted to engage with the supports to hold them at any desired inclination, and thus regulate the height of the pan.

For a full description of the invention and the merits thereof and also to acquire a knowledge of the details of construction of the means for effecting the result reference is to be had to the following description and accompanying drawings, in which—

Figure 1 is a perspective view of a pan provided with my attachment. Fig. 2 is a side elevation of a portion of the pan having the attachment connected thereto. Fig. 3 is a detail perspective view of the members of the device when detached.

Corresponding and like parts are referred to in the following description and indicated in all the views of the drawings by the same reference characters.

This attachment is shown as applied to the pan 1, which may be of any conventional type and is shown in the drawings as being of circular formation. Three of the supports are shown as arranged equidistant about the pan, although any suitable number may be employed without departing from the spirit of the invention. The supports 2 are pivotally mounted upon lugs 3, which project from the sides of the pan 1 near the bottom thereof. Extensions 4 project upwardly from the supports 2 and are adapted to engage with the racks 5, and thus regulate the inclination of the supports. Each rack 5 is shown as formed of a strip of sheet metal, which is provided along one of its edges with a series of teeth 6 and is provided at its extremities with transversely-projecting basal flanges 7, which are riveted or otherwise rigidly secured to the sides of the pan. The free end of the extension 4 is provided with a finger-piece 8, formed by looping the wire, and has a spring engagement with the rack 5, which is arranged in the form of an arc about the pivot 3. The support 2 and extension 4 are preferably formed of a single piece of wire, which is coiled about the stud 3 at an intermediate point and is provided at its lower extremity with an enlargement 9. The teeth 6 upon the rack 5 are so formed that in the operation of the device the pan can be raised by pushing upwardly upon the finger-piece 8 and causing the extension 4 to slip over the teeth 6. However, when it is desired to lower the pan it is necessary to pull outwardly upon the finger-piece 8 and disengage the member 4 from the teeth 6 before the handle can be pushed downwardly.

From the foregoing description it will be readily understood that the supports 2 can be held at any desired inclination and the elevation of the pan thus readily adjusted.

Having thus described the invention, what is claimed as new is—

1. The combination of a pan, supports pivotally connected to the sides thereof, extensions projecting from said supports, and means for adjustably engaging the extensions to hold the supports at any inclination in order to regulate the elevation of the pan.

2. The combination of a pan, supports pivotally connected to the sides thereof, extensions projecting from the supports, and racks secured to the pan and engaging with the extensions to hold the supports at the desired inclination.

3. The combination of a pan, supports pivotally connected to the sides thereof, upwardly-projecting extensions from said supports, and racks secured to the pan and engaging with the extensions to hold the supports at the desired inclination.

4. The combination of a pan, supports pivotally connected thereto, spring extensions projecting from the supports, and racks upon the pan with which the extensions have a spring engagement in order to hold the supports at the desired inclination.

5. The combination of a pan, lugs projecting from the sides of the pan, supports pivotally connected to the pan, extensions projecting upwardly from the supports, said supports and extensions being formed of single pieces of wire which are coiled about the before-mentioned lugs at an intermediate point, and racks secured to the pan and having a spring engagement with the extensions to hold the supports at the desired inclination.

In testimony whereof I affix my signature in presence of two witnesses.

EARNEST KOPE. [L. S.]

Witnesses:
O. H. MUIR,
ALEX. M. MUIR